United States Patent
Golub et al.

(10) Patent No.: US 9,072,926 B2
(45) Date of Patent: Jul. 7, 2015

(54) METHOD FOR STABILIZING WASTE AND HAZARDOUS WASTE

(71) Applicant: Environmental Services Company Ltd., Beer Sheva (IL)

(72) Inventors: Gilad Golub, Lehavim (IL); Julio Subovich, Beer Sheva (IL)

(73) Assignee: Environmental Services Company Ltd., Beer-Sheva (IL)

( * ) Notice: Subject to any disclaimer, the term of this patent is extended or adjusted under 35 U.S.C. 154(b) by 12 days.

(21) Appl. No.: 13/767,408

(22) Filed: Feb. 14, 2013

(65) Prior Publication Data

US 2014/0005461 A1    Jan. 2, 2014

(51) Int. Cl.
| | |
|---|---|
| *B09B 1/00* | (2006.01) |
| *A62D 3/33* | (2007.01) |
| *G21F 9/30* | (2006.01) |
| *C02F 11/00* | (2006.01) |

(52) U.S. Cl.
CPC *A62D 3/33* (2013.01); *G21F 9/302* (2013.01); *B09B 1/00* (2013.01); *C02F 11/008* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,837,872 | A | * | 9/1974 | Conner .................... 588/252 |
| 3,980,558 | A | * | 9/1976 | Thompson ................ 588/252 |
| 4,142,912 | A | * | 3/1979 | Young ...................... 588/252 |
| 4,226,631 | A | * | 10/1980 | Kubota ..................... 588/252 |
| 4,297,304 | A | * | 10/1981 | Scheffler et al. ............. 588/3 |
| 4,404,105 | A | * | 9/1983 | Rysman de Lockerente et al. ......................... 588/18 |
| 4,804,147 | A | | 2/1989 | Hooper |
| 5,582,573 | A | * | 12/1996 | Weszely ................... 588/257 |

FOREIGN PATENT DOCUMENTS

| | | |
|---|---|---|
| EP | 447530 | 7/1995 |
| WO | 2012/145660 | 10/2012 |

OTHER PUBLICATIONS

M.M. Smadi, R.H. Haddad / "The use of oil shale ash in Portland cement concrete" Cement & Concrete Composites 25 (2003) 43-50.*
Georg Dirk: Waste Management 16 (1996) 51-7.

* cited by examiner

*Primary Examiner* — John Kreck
(74) *Attorney, Agent, or Firm* — Alston & Bird LLP

(57) ABSTRACT

The invention provides a process for stabilizing waste by landfilling, including mixing the waste with ash after burning oil shale, whereby safely stabilizing inorganic or organic waste by embedding it in a hardened matter exhibiting a high compression strength.

17 Claims, No Drawings

METHOD FOR STABILIZING WASTE AND HAZARDOUS WASTE

FIELD OF THE INVENTION

The present invention relates to stabilizing waste by landfilling, including mixing the waste with cement substitute, and subsequent stabilizing and solidifying the mixture in the landfill, thereby immobilizing waste or toxic waste by an economical and environmentally safe process.

BACKGROUND OF THE INVENTION

The disposal of industrial and home waste poses one of the most challenging problems in the modern civilization. Chemical and biological pollutants spread over the whole Earth surface, and contaminate surface and ground waters; they pollute agricultural land and enter to the food chain; they have detrimental effects on the whole life, affecting biochemical pathways and ecological balance; they endanger the human health and contribute to species extinctions. The new ecological thinking and environmental awareness, aiming at sustainable development, support remediation of contaminated sites and stabilization of newly disposed waste. Of many hundred millions of tons of waste generated every year in the U.S. alone, more than 40 million tons are defined as particularly hazardous waste [http://www.epa.gov/osw/basic-hazard.htm].

Landfill is an important disposal method, including burying the waste in artificial cavities on the land surface or under it. Landfilling in developed countries is strictly regulated, particularly for hazardous waste, when the parameters of the landfill site are carefully controlled to prevent any leaching of toxic chemicals out of the site. One of ways how to stabilize dangerous materials in the landfill site is entrapping and immobilizing it within a concrete structure. Although an investment into a safe waste disposal is more cost-effective than subsequent decontamination efforts, safe landfilling may be quite costly, particularly when using commercial cements. Commercial cements, as having to comply with strict requirements for public constructions, may be relatively expensive when used for burying waste. Moreover, these cements have often to be transported along great distances from production units to the landfill sites, thus increasing environmental pollution and also the costs. There have been attempts to replace expensive cements such as Portland cement with cheaper substitutes, for example with fly ash generated as a side product during burning coal in power plants. But not all cementitious materials comply with still harsher safety requirements for burying hazardous waste under various geological and atmospheric conditions, and the demand for new cement substitutes perpetually increases, particularly in view of the escalating waste mass generated around the world. It is therefore an object of this invention to provide a new cement substitute, and a new safe and cost effective process for stabilizing waste and toxic waste.

It is also an object of the invention to utilize a cheap or useless byproduct obtained from burning a fossil fuel as a regent for stabilizing hazardous waste, thus effectively handling two wastes simultaneously.

It is another object of this invention to provide a process for stabilizing a hazardous waste for landfill.

It is still another object of this invention to provide a process for stabilizing a hazardous waste for landfill, the process being suitable and adjustable for a variety of waste materials.

Other objects and advantages of present invention will appear as description proceeds.

SUMMARY OF THE INVENTION

The invention provides a method for stabilizing hazardous waste, comprising the steps of i) providing ash after burning oil shale (shale ash); ii) mixing said hazardous waste to be stabilized with said shale ash, wherein said ash is added in an amount of between 0.45 and 2.0 weight parts per one weight part of said waste, and iii) transferring said mixture to the site of landfill. The method for stabilizing and immobilizing hazardous waste according to the invention preferably comprises steps of i) providing shale ash; ii) providing hazardous waste to be stabilized and mixing it with said shale ash, while further optionally mixing with an alkaline component in an amount of between 0.0 and 1.0 weight parts per one weight part of said waste, and optionally also with water in an amount not greater than necessary for obtaining a blendable paste, thereby obtaining a homogenizable mixture; and iii) transferring said mixture to the site of landfill and allowing it to harden; thereby obtaining a stabilized waste safely embedded in a hardened matter exhibiting within seven days a compression strength of preferably at least 1 MPa. Said step of providing hazardous waste to be stabilized may include processing primary waste, and may comprise procedures aiming at adjusting concentrations of components, as well as adjusting the consistency of the waste before contacting it with said ash. Said hardened matter has preferably the form of a stable cement block. Said shale ash may be added, for example, in an amount between 0.5 and 1.0 weight parts per one weight part of said waste, and said alkaline component in an amount between 0.05 and 1.0 weight parts per one weight part of said waste. In one embodiment, the method for stabilizing and immobilizing hazardous waste according to the invention comprises steps of i) providing shale ash; providing hazardous waste to be stabilized and mixing it with said shale ash in an amount of between 0.6 and 0.8 weight parts per one weight part of said waste, and with an alkaline component in an amount of between 0.05 and 0.15 weight parts per one weight part of said waste, and optionally with water in an amount that adjusts its final concentration in the mixture to not more than 40 wt %; iii) transferring said mixture to the site of landfill and allowing it to harden; wherein said hardened matter exhibits within seven days, for example after seven days, a compression strength of at least 3 MPa. In other embodiment, the method according to the invention comprises i) providing shale ash; providing hazardous waste to be stabilized and mixing it with said shale ash in an amount of between 0.6 and 0.8 weight parts per one weight part of said waste, and with an alkaline component in an amount of between 0.05 and 1.0 weight parts per one weight part of said waste, and optionally with water in an amount that adjusts its final concentration in the mixture to between 18 and 25 wt %, homogenizing the mixture; and transferring said mixture to the site of landfill and allowing it to harden; thereby obtaining a stabilized waste safely embedded in a hardened matter exhibiting after seven days a compression strength of at least 6 MPa. Water may be incorporated into the mixture within said waste to be stabilized, or it may be separately added or both, but the final amount of water in the mixture will be adjusted to ensure the desired properties of the hardened matter of the immobilized waste. Said alkaline component is selected from Portland cement, slag cement, clinker, sodium silicates, sodium carbonates, alkali metal hydroxides, and alkaline earth metal hydroxides. Said shale ash is selected from fly ash, bottom, ash, crushed ash, and a mixture thereof. Advantageously, said hardened matter in the method of the invention has usually a reduced volume in comparison with a matter prepared from Portland cement without adding shale ash. Said waste to be stabilized by the method according to the invention may comprise sludge or filtration cakes. Said waste may be solid or liquid, and it may have the form of suspension or paste or sludge. Said waste may comprise inorganic compounds in one embodiment, or it may comprises organic compounds in other embodiment, or it may comprise a mixture of both. Said waste may comprises biological waste. Said waste may comprise an item selected from the group consisting of sewage sludges, sludges from municipal sanitary wastewater treatment centers, materials from waste and wastewater treatment plants, sludges of lake or river sediments, petroleum refinery sludge, effluent sludges form pharmaceutical production, pulp and paper industry wastes, printing wastes, acrylic latex wastes, sludges from metal surface processing, leather industry wastes, and chemical industry wastes. Waste to be processed according to the invention may comprise an item selected from the group consisting of cyanide compounds, arsenic, heavy metals, organophosphates, halogenated organic compounds, organometallic compounds, and pesticides. Said pesticides may comprise insecticides, acaricides, fungicides, rodenticides, pediculicides, and biocides, or herbicides, and other agricultural chemicals. In some embodiments of the method according to the invention, said waste is treated before mixing with said shale ash; said treatment may comprise removing or neutralizing a component from said waste. Said treatment may comprise removing a solvent from said waste. Said treatment may comprise neutralizing an acidic component. In other embodiment of the method according to the invention, said treatment comprises a chemical reaction of a component of the waste. In one special aspect, the waste to be stabilized according to the invention, may contain a radioactive isotope.

DETAILED DESCRIPTION OF THE INVENTION

It has now been surprisingly found that toxic waste my be neutralized by immobilizing within hardened cement composition comprising oil shale ash, while being able to substitute a great part of Portland cement in the mixture.

The invention is directed to disposal of toxic or otherwise dangerous material by encapsulating the material within a landfilled concrete structure. Leaching at the disposal site may be minimized by employing ash generated during burning oil shale, which may seem surprising as oil shale has been considered to be an inferior fuel in comparison with all other fossil fuels, including coal. As the market pushes toward broader fuel assortment, large oil shale deposits around the world may, by employing modern extraction technologies, find still wider utilization; however, harmful or useless ash is produced by burning said shale oil. Said ash obtained after the shale burning may now be advantageously liquidated, while using it as a superior cementitious material in landfilling of hazardous materials. The contribution of the invention to the sustainable development is thus many fold: i) formerly overlooked shale oil broadens the assortment of the energy sources, ii) a side product of the shale burning, otherwise being an ecological burden, is easily eliminated, while iii) enabling ecologically safe burial of dangerous waste.

The method of the invention may be advantageously employed in neutralizing hazardous residues during and after reclaiming sewage ponds or waste stabilization ponds, and when treating sediment tanks. The invention is directed to the immobilization of hazardous waste, including its drying and solidification, and the neutralization of its effects on the environment, whereas the steps leading to the final benign effects are carried out in situ or ex situ. Oil shale ash has now been found to have superior properties for the processing hazardous waste according to the invention, including fly ash, bottom, ash, crushed ash, and mixed ash. The ash acts as an absorption means, enabling to process hazardous waste comprising a broad range of the water contents. The stabilized waste product is a solid having a sufficient strength to bear weights and other forces exerted during creating and using the landfilling during initial active stages, as well as during later passive stages, the compression strength of the solid being at least 1 MPa, but usually much more, such as at least 3 MPa, for example at least 6 MPa or at least 9 MPa.

Physically and chemically unstable wastes may be converted through the method of the invention to a stabilized material, safe for landfill, possibly comprising non-biologic or biologic, organic or inorganic, water soluble or insoluble compounds, the method including the incorporation of the waste into a mixture fly ash water mixture which hardens under atmospheric conditions to form an environmentally acceptable, impermeable, load-bearing material. Portland cement, possibly used as an activator, is admixed only in a limited amount or not at all. Wastes may include, for example, various residues obtained in chemical productions or during chemical research and development. Hazardous wastes to be detoxified by the invention may include biological waste. The waste may include undesired inorganic materials, for example including sulfides or metals or metal salts. Examples of wastes include paint and printing wastes, pulp and paper industry wastes, leather industry wastes, latex wastes, metal surface processing wastes, petroleum products refining wastes, wastes containing heavy metals, wastes containing organic compounds exhibiting deleterious biological activities, expired or non-expired pesticide materials, including organophosphates like Parathion, organometallic materials. The waste may comprise mercury wastes, sewage sludges, petroleum refinery sludge, waste emulsion polymeric productions, sludges of lake or river sediments, effluent sludges form pharmaceutical production or laboratories. Examples of the materials to be immobilized may include insecticide and decommissioned nerve gas emulsions, halogenated organic compounds like DDT, polychlorinated biphenyls, PCP, etc., arsenic or cyanic compounds. The wastes may include suspensions, emulsions, concentrated solutions, powders, pastes, sludges, filter cakes, and the like. The shale ash has, beside its pozzolanic activity, also ability to neutralize some hazardous components, absorb and stabilize them, thereby synergistically employ its various properties for the desired purpose of stabilizing hazardous waste. In some embodiments, in accordance with the type of stabilized materials, additives are used to enhance the stabilization, for example sodium sulfide, etc. For example, ferric chloride may oxidize some waste components when desired.

The shale ash is preferably used together with an alkali additive, such as carbonate, bicarbonate, silicate, oxide, etc., and preferably Portland cement. The waste material is mixed with shale ash and the alkali component in the presence of water, the components exothermically reacting at atmospheric conditions, and forming a cementitious matrix in which the waste material is embedded. The initial set occurs within 3 to 30 hours.

The waste, essentially immobilized within the cement structure may constitute 20-80 wt % of the starting mixture, preferably 20-50 wt %, which is blended in a mixing apparatus, such as pug mills, ribbon blenders, vertical mixers, and any suitable cement or concrete mixing equipment enabling intimate contact between the components and water, which may be comprised in an amount between 5-60 wt %, preferably 15-50 wt %. In a preferred embodiment of the invention, the water content of the waste is determined and the amount of water to be added, if any, is calculated. The cementitious paste is homogenized, and transferred to the landfill site, where it is allowed to harden and essentially form hardly permeable, low-leaching, concrete-like material, which is mechanically enough stable to bear the necessary load in the layers of the landfill site. Heavy mechanical means are used in situ, when placing the processed hazardous material and arranging it in the landfilling site, or when reclaiming contaminated areas, while complying with the required stabilization parameters.

The buried waste material will comply with usual International Standards, for example with European Standard EN 12547-2:2002 for leaching of waste materials, or with American and European criteria for waste at landfills pursuant to 16 of Directive 2003/33/EC.

The invention, thus, relates to a method for stabilizing and/or immobilizing and/or solidification of hazardous waste, comprising steps of mixing said waste with shale ash and optionally an alkaline component and water, wherein said ash is added in an amount of between 0.45 and 2.0 weight parts per one weight part of said waste, and said alkaline component in an amount of between 0.00 and 1.0 weight parts per one weight part of said waste, and water in an amount not greater than necessary for obtaining a blendable paste, thereby obtaining a homogenizable mixture; and transferring said mixture to the site of landfill and allowing it to harden; thereby obtaining a stabilized waste safely embedded in a hardened matter, possibly in the form of a cement block exhibiting after seven days a compression strength of at least 1 MPa. A mixture comprising the hazardous waste, shale ash, alkaline component, and water is usually homogenized to obtain a slurry or paste, which is buried on the landfill site. Per one weight part of the waste, the components are usually added in amounts of: ash between 0.45 and 2.0 weight parts, preferably between 0.5 and 1.0 weight parts, for example between 0.6 and 0.8 weight parts per one weight part of said waste; alkali component between 0.0 and 1.0 weight parts, for example between 0.0 and 0.5 weight parts or between 0.05 and 0.15 weight parts or between 0.05 and 1.0 weight parts per one weight part of said waste. Water is usually adjusted to comprise between 15 and 50 wt % of the mixture, preferably between 18 and 40 wt %, for example between 18 and 25 wt %. One examples of a waste blend before hardening may include a mixture of 1 weight part of waste, 0.7 weight part of shale ash, 0.1 weight part of Portland cement, and 1 weight part of water. Another example of such a blend may include a mixture of 1 weight part of waste, 0.7 weight part of shale ash, 0.4 weight part of Portland cement, and 0.6 weight part of water.

In one embodiment of the invention, the waste to be stabilized has less than 12 wt % of organic compounds, such as less than 6 wt %, and less than 1000 ppm ammonia or ammonium salts, and less than 10 wt % salts soluble in water.

The invention will be further described and illustrated in the following examples.

EXAMPLES

Materials and Methods

A broad variety of industrial hazardous wastes has been used in the stabilization tests, in which the waste has been mixed with water and with at least one of the following components: any type of cement, including Portland, slag and other commercial cements, clinker, coal fly ash, shale fly ash, sodium silicate, $Ca(OH)_2$, NaOH 48%. In some experiments, effects of other chemicals in the mixture before hardening have been examined, including sodium sulfide, calcium nitrate, ferric chloride, sodium bicarbonate, sodium chloride, gypsum, active carbon, and phosphoric acid. The mixture samples were shaped into cylinders 5 cm diameter×10 cm height, allowed to harden and regularly checked within 90 days.

The compression strength (CS in MPa) has been measured by casting cement samples into defined shapes and applying onto them well defined increasing strength, and reading the strength at the moment of breakage.

The samples of stabilized waste were placed in mixed water, and supernatant was regularly measured for DOC, TDS, and conductivity, whereby characterizing the leaching extent.

DOC/TOC measurement included determining, in one half of a sample, the total carbon (TC) by heating in the oxygen atmosphere at 900° C. and measuring the released carbon oxide by IR, and determining, in the other half of the sample, the inorganic carbon (IC) by acidifying the sample and measuring the released carbon dioxide by IR, and finally calculating the total organic carbon: TOC=TC−IC. The dissolved organic carbon (DOC) in mg/kg has been calculated from TOC. The carbon dieoxide concentrations were read from calibration curves.

TDS (total dissolved solids in %) measurement included drying filtered samples at 180° C. in a crucible to the constant weight.

The concentration of Cl, P, S, and metals were determined by inductively coupled plasma-atomic emission spectrometry, after injecting samples into a high-temperature argon plasma.

The waste materials included acid filter cakes from various manufactures, carbon filter cakes, dried aluminum oxide filters, etc., obtained from Israeli chemical companies. Various waste samples, used in developing the method of the invention, included, among other hazardous materials, also mercury containing sludges, organic toxins, sulfides, cyanates, soluble metal salts, brominated organic compounds, and arid tar sludges.

Coal fly ash has been obtained from the power plant at Hadera, Israel, from burning several types of lignite coal. Oil shale fly ash (shortly shale ash) has been obtained from the power plant at Mishor Rotem, Israel, from burning local oil shale, obtained in the vicinity of the power plant.

Example 1

Cement or Ash Alone 500 g cement or ash was mixed with 25 g silica and 180 g water, and allowed to harden. The CS values after 7 days are in Tab. 1.

TABLE 1

Compression strength values of solidified mixtures employing cements or shale ash.

| | Material | | | |
|---|---|---|---|---|
| | coal ash | clinker | Portland cement | shale ash |
| CS (MPa) | 0.7 | 5.5 | >15 | >15 |

The shale ash showed much better behavior than coal ash even when used alone.

Example 2

Coal Ash or Shale Ash in Mixtures with Waste 1000 g waste derived from the treatment of waste water, rich in aluminum oxide and organic compounds was mixed with 800 g cement or oil shale fly ash or shale ash, and with 2000 g water, allowing the mixture to harden. The CS, TDS, and DOC values after 7 days are in Tab. 2.

TABLE 2

The values of compression strength (CS), dissolved organic compounds (DOC), and total dissolved solids (TDS), measured for solidified mixtures employing three alternative materials.

| | Material | | |
|---|---|---|---|
| | Portland cement | coal ash | shale ash |
| CS (MPa) | 3.5 | 1.2 | 5.2 |
| DOC (mg/kg) | 760 | 880 | 750 |
| TDS (%) | 5.0 | 2.0 | 4.6 |

The shale ash showed better waste stabilizing properties than coal ash, and even better than Portland cement alone.

Example 3

Shale Ash Substituting Portland Cement 1000 g waste comprising fly ash obtained in burning a highly toxic, material (mixture of organic and inorganic toxic materials), captured by water screen, was mixed with various amounts of shale ash and Portland cement, and allowed to harden. The CS, TDS, and DOC values after 7 days are in Tab. 3.

TABLE 3

The values of compression strength (CS), dissolved organic compounds (DOC), and total dissolved solids (TDS), measured for solidified mixtures employing various ratios of Portland cement and shale ash.

| | Shale ash (g) + Portland (g) | | | | |
|---|---|---|---|---|---|
| | 0 + 950 | 0 + 1140 | 190 + 950 | 850 + 100 | 1040 + 100 |
| CS (MPa) | 3.2 | 7.7 | 7.9 | 4.6 | 6.9 |
| DOC (mg/kg) | 2016 | 1597 | 1092 | 1068 | 530 |
| TDS (%) | 18.4 | 6.4 | 4.6 | 4.0 | 2.5 |

The shale ash can replace 90% Portland cement, while the resulting hardened cement still complies with the required characteristics.

Example 4

Shale Ash Versus Portland Cement 500 g waste was mixed with 450 g cement or fly ash, 50 g silica, and 190 g water, and allowed to harden. The waste type 1 comprised filter press comprising heavy metals, insoluble and soluble salts and organic matter, after reaction with lime; waste type 2 comprised fly ash obtained in burning a highly toxic material, both organic and inorganic, captured by water screen; waste type 3 comprised filter press with high metallic content; waste type 4 comprised high levels of brominated organic compounds. The concrete densities after 7 days are in Tab. 4.

TABLE 4

Densities of four types of solidified waste, either stabilized with Portland cement, or with shale ash.

| | Waste Material Used | | | |
|---|---|---|---|---|
| | 1 | 2 | 3 | 4 |
| Density with Portland Cement (g/cm$^3$) | 1.602 | 1.733 | 1.586 | 1.601 |
| Density with shale ash (g/cm$^3$) | 1.64 | 1.74 | 1.69 | 1.6 |
| Volume increase (%) | −2.3 | −0.2 | −6.7 | 0.3 |

The concrete made in accordance with the invention had usually reduced volume when compared with the concrete prepared from Portland cement.

While this invention has been described in terms of some specific examples, many modifications and variations are possible. It is therefore understood that within the scope of the appended claims, the invention may be realized otherwise than as specifically described.

The invention claimed is:

1. A method for stabilizing and immobilizing hazardous waste, comprising steps of
    i) providing ash after burning oil shale (shale ash);
    ii) providing hazardous waste to be stabilized and mixing it with said shale ash wherein said ash is added in an amount of between 0.5 and 1.35 weight parts per one weight part of said waste, and further with an alkaline component selected from Portland cement, slag cement, clinker, sodium silicates, sodium carbonates, alkali metal hydroxides, and alkaline earth metal hydroxides in an amount of between 0.05 and 0.15 weight parts per one weight part of said waste, and optionally with water in an amount not greater than necessary for obtaining a blendable paste, thereby obtaining a homogenized mixture; and
    iii) transferring said mixture to a site of landfill and allowing it to harden;
    thereby obtaining a stabilized waste safely embedded in a hardened matter exhibiting after seven days a compression strength of at least 1 MPa.

2. A method according to claim 1,
    wherein said shale ash is added in an amount of between 0.6 and 0.8 weight parts per one weight part of said waste, said water is added in an amount that adjusts its final concentration in the mixture to not more than 40 wt %;
    and wherein said hardened matter exhibits after seven days a compression strength of at least 3 MPa.

3. A method according to claim 2,
    wherein said water is added in an amount that adjusts its final concentration in the mixture to between 18 and 25 wt %, and wherein
    said hardened matter exhibits after seven days a compression strength of at least 6 MPa.

4. A method according to claim 1, wherein said ash is selected from fly ash, bottom, ash, crushed ash, and a mixture thereof.

5. A method according to claim 1, wherein said hardened matter has a reduced volume in comparison with matter prepared from Portland cement without shale ash.

6. A method according to claim 1, wherein said waste comprises sludge or filtration cake.

7. A method according to claim 1, wherein said waste comprises inorganic compounds.

8. A method according to claim 1, wherein said waste comprises organic compounds.

9. A method according to claim 1, wherein said waste comprises biological waste.

10. A method according to claim 1, wherein said waste comprises an item selected from the group consisting of sewage sludges, sludges from municipal sanitary wastewater treatment centers, materials from waste and wastewater treatment plants, sludges of lake or river sediments, petroleum refinery sludge, effluent sludges form pharmaceutical production, pulp and paper industry wastes, printing wastes, acrylic latex wastes, sludges from metal surface processing, leather industry wastes, and chemical industry wastes.

11. A method according to claim 1, wherein said waste comprises an item selected from the group consisting of cyanide compounds, arsenic, heavy metals, organophosphates, halogenated organic compounds, organometallic compounds, and pesticides.

12. A method according to claim 1, wherein said waste is treated before mixing with said shale ash.

13. A method according to claim 12, wherein said treatment comprises removing or neutralizing a component from said waste.

14. A method according to claim 12, wherein said treatment comprises removing a solvent from said waste.

15. A method according to claim 12, wherein said treatment comprises neutralizing an acidic component.

16. A method according to claim 12, wherein said treatment comprises a chemical reaction of a component of the waste.

17. A method according to claim 1, wherein said waste is radioactive.

* * * * *

UNITED STATES PATENT AND TRADEMARK OFFICE
CERTIFICATE OF CORRECTION

| | | |
|---|---|---|
| PATENT NO. | : 9,072,926 B2 | Page 1 of 1 |
| APPLICATION NO. | : 13/767408 | |
| DATED | : July 7, 2015 | |
| INVENTOR(S) | : Golub et al. | |

It is certified that error appears in the above-identified patent and that said Letters Patent is hereby corrected as shown below:

Title Page

Below Item (22) insert the following:
--(30) Foreign Application Priority Data
July 2, 2012     (IL) ........................220731--.

Signed and Sealed this
Twelfth Day of April, 2016

Michelle K. Lee
*Director of the United States Patent and Trademark Office*